United States Patent
Dunn et al.

(10) Patent No.: US 11,121,565 B2
(45) Date of Patent: Sep. 14, 2021

(54) HIGH RELIABILITY HYBRID ENERGY STORAGE SYSTEM

(71) Applicants: Randy B. Dunn, Orange, CA (US); Alan Horn, Macomb, MO (US)

(72) Inventors: Randy B. Dunn, Orange, CA (US); Alan Horn, Macomb, MO (US)

(73) Assignee: ELECTRIC POWER SYSTEMS, LLC, North Logan, UT (US)

( * ) Notice: Subject to any disclaimer, the term of this patent is extended or adjusted under 35 U.S.C. 154(b) by 273 days.

(21) Appl. No.: 16/336,466

(22) PCT Filed: Sep. 26, 2017

(86) PCT No.: PCT/US2017/053534
§ 371 (c)(1),
(2) Date: Mar. 25, 2019

(87) PCT Pub. No.: WO2018/058137
PCT Pub. Date: Mar. 29, 2018

(65) Prior Publication Data
US 2019/0229542 A1    Jul. 25, 2019

Related U.S. Application Data

(60) Provisional application No. 62/399,746, filed on Sep. 26, 2016.

(51) Int. Cl.
H02J 7/00    (2006.01)
H02J 1/06    (2006.01)
(Continued)

(52) U.S. Cl.
CPC ......... *H02J 7/0024* (2013.01); *H01M 16/006* (2013.01); *H02J 1/06* (2013.01);
(Continued)

(58) Field of Classification Search
CPC .... H02J 7/0024; H02J 7/34; H02J 1/06; H02J 7/342; H02J 2310/48; H02J 2207/20;
(Continued)

(56) References Cited

U.S. PATENT DOCUMENTS 4,961,151 A    10/1990 Early et al.
2003/0230671 A1    12/2003 Dunn
(Continued)

OTHER PUBLICATIONS

EP; Supplemental European Search Report in the EP Application No. 17854144.7 dated Mar. 20, 2020.
(Continued)

*Primary Examiner* — Zixuan Zhou
(74) *Attorney, Agent, or Firm* — Snell & Wilmer L.L.P.

(57) ABSTRACT

Combination fuel cell stack and electrochemical battery system provides stable and redundant electrical power to one or more traction motors. The electrochemical battery packs comprise modules that are switched between a low-voltage parallel configuration connecting to the fuel cell stack and a high-voltage series configuration connecting to the traction motors, thereby harvesting low-voltage energy from the fuel cells and deploying that energy as high-voltage power to the motor. The plurality of electrochemical battery packs can be switched such that at least one is always connected to the traction motor for continuity of power.

15 Claims, 6 Drawing Sheets

(51) Int. Cl.
  *H02J 7/34* (2006.01)
  *H01M 16/00* (2006.01)

(52) U.S. Cl.
  CPC .......... *H02J 7/34* (2013.01); *B64C 2201/042* (2013.01); *H02J 7/342* (2020.01); *H02J 2207/20* (2020.01); *H02J 2300/30* (2020.01); *H02J 2310/48* (2020.01); *Y02E 60/10* (2013.01); *Y02E 60/50* (2013.01); *Y02T 10/70* (2013.01)

(58) Field of Classification Search
  CPC ...... H02J 2300/30; H02J 7/14; H02J 2310/12; H01M 16/006; H01M 16/00; H01M 50/20; H01M 10/44; Y02E 60/50; Y02E 60/10; Y02T 10/70; B64C 2201/042; B60L 53/11; B60L 53/30; B60L 53/80; B60L 53/305; B60L 58/12; B60L 50/64
  USPC ............................. 320/109, 116–119; 701/22
  See application file for complete search history.

(56) References Cited

U.S. PATENT DOCUMENTS

| | | |
|---|---|---|
| 2006/0006739 A1 | 1/2006 | Gonzales |
| 2007/0062744 A1 | 3/2007 | Weidenheimer |
| 2011/0001442 A1 | 1/2011 | Lee et al. |
| 2011/0082611 A1 | 4/2011 | Shiba |
| 2013/0110337 A1 | 5/2013 | Kondoh |
| 2018/0029588 A1* | 2/2018 | Naidu .................... B60L 58/21 |

OTHER PUBLICATIONS

International Preliminary Report on Patentability in the International Application No. PCT/US2017/053534 dated Apr. 4, 2019.
International Search Report and Written Opinion in the International Application No. PCT/US2017/053534 dated Dec. 7, 2017.

* cited by examiner

HIGH RELIABILITY HYBRID ENERGY STORAGE SYSTEM

CROSS REFERENCE TO RELATED APPLICATIONS

This application is a U.S. national stage entry under 35 U.S.C. § 371 of International Application No. PCT/US2017/53534 filed Sep. 26, 2017 entitled "HIGH RELIABILITY HYBRID ENERGY STORAGE SYSTEM", which claims priority to, and the benefit of, U.S. Provisional Application Ser. No. 62/399,746 filed on Sep. 26, 2016. Each of the foregoing applications are hereby incorporated by reference in their entirety.

TECHNICAL FIELD OF THE INVENTION

The present invention relates generally to energy storage systems for electric vehicles, such as aircraft, and more specifically, for energy storage systems utilizing fuel cell stacks combined with batteries to provide appropriate voltage to electric motors of electric vehicles.

BACKGROUND OF THE INVENTION

A secondary battery is a device consisting of one or more electrochemical or electrostatic cells, hereafter referred to collectively as "cells," that can be charged electrically to provide a static potential for power or released electrical charge when needed. Electrochemical cells typically comprise at least one positive electrode and at least one negative electrode. One common form of such cells are secondary cells packaged in a cylindrical metal can or in a prismatic case. Examples of chemistry used in such secondary cells are lithium cobalt oxide, lithium manganese, lithium iron phosphate, nickel cadmium, nickel zinc, and nickel metal hydride. Such cells are mass produced, driven by an ever-increasing consumer market that demands low-cost rechargeable energy for portable electronics.

Fuel cells are another source of electrical power. Proton exchange membrane fuel cells, also known as polymer electrolyte membrane (PEM) fuel cells, are one type of fuel cell used to power traction motors in order to propel electric vehicles. PEM fuel cells convert chemical potential energy in the form of hydrogen and oxygen directly into electrical energy and are thus inherently more efficient than combustion engines, which must first convert chemical potential energy into heat, and then mechanical work. Direct emissions from a fuel cell system are water and heat. Fuel cells have no moving parts and are thus more reliable than traditional engines.

Secondary batteries and fuel cells are often used to drive traction motors to propel electric vehicles, including electric bikes, motorcycles, cars, busses, trucks, trains, airplanes and so forth. Such traction batteries and fuel cell systems are usually large, comprised of tens to hundreds or more individual cells. In order to attain the desired operating voltage level, electrochemical cells are electrically connected in series to form a battery of cells, typically referred to as a battery. Use of larger cells or cells in parallel can increase the power and energy level of a battery. Similarly, fuel cells are electrically connected in series to form what is typically referred to as a fuel cell stack. Larger fuel cells can increase the power level of the stack. Energy is increased simply by supplying more fuel.

A critical metric for an energy storage system in traction applications is energy density. Energy density is a measure of a system's total available energy with respect to its mass, often measured in Watt-hours per kilogram (Wh/kg). Power density is a measure of the system's power delivery with respect to the cell's mass, usually measured in Watts per kilogram (W/kg). Batteries and fuel cells differ in their respective energy densities and power densities. In traction applications, energy density is desirable as it is directly proportional to the endurance or travel range of the system. Power is directly proportional to acceleration, and take-off and/or launch performance. Both are necessary for overall system performance.

Fuel cells are typically high in energy density and low in power density when compared to batteries. For example, an exemplary fuel cell system for transportation applications can produce around 450 W/kg of power and deliver around 600 Wh/kg of energy from one charge of hydrogen in a practical transportation application. In contrast, currently commercially available energy cells are capable of these power levels achieve only around 260 Wh/kg, less than half that of comparable fuel cells. Other commercially available energy cells focus on power density, rather than energy density. For example, a commercially available prismatic lithium titanate (LTO) cell can produce more than 5,000 W/kg, around 11 times more power per mass than the exemplary fuel cell. The LTO cell does this at the expense of energy density, being capable of only 100 Wh/kg of energy from a single charge, which is about one sixth the energy density of the exemplary fuel cell. Thus the LTO cell and the exemplary power cell have vastly differing power and energy characteristics.

Another difference between batteries (i.e., energy cells) and fuel cells is their respective recharging methods. Energy expended by a battery is replaced by direct electrical recharging, which is a relatively time consuming process, often requiring one or more hours to complete. The LTO cell previously described is different than most batteries in that it is capable of recharging in less than 10 minutes. However, this rate of recharge requires a large battery charger and draws a great deal of short-term power from the grid. Such short-term power demands often come at a higher price, since the cost of electricity is impacted by the rate of draw. In widespread application, this can cause stability problems with the grid, something that the utility providers deem highly undesirable. Adding batteries to the charging system can stabilize the load, but comes at great cost since these batteries must have as much capacity as required to meet the constant recharge demands for the application. In most cases this is substantial. Further, such a battery will have to be replaced over time as it ages and loses capacity due to cycle degradation.

By contrast, fuel cells are refueled by the insertion of hydrogen gas. This process can be completed in just a couple of minutes from a tank and does not impact the electrical grid as does the recharging process. This is advantageous for transportation applications wherein operators expect short refueling times, similar to those of conventional gas refueling processes. The refueling station can also generate hydrogen gas locally from water and electricity via electrolysis and store the generated hydrogen in large tanks. This allows the load on the grid to be constant and the storage is cost-effective since the tanks can scale in size with minimal additional cost. Further, the tanks do not suffer from rapid cycle wear like storage batteries in a charging system.

Yet another difference between batteries and fuel cells is their respective abilities to deliver power on demand. If charged sufficiently, batteries can immediately deliver power to a load. In contrast, fuel cells require a warming period of time, and therefore very little operating power is immediately available. This is problematic in most traction applications, especially vehicles used for transportation. Operators expect immediate power on startup of a vehicle, as is the case with gas-powered vehicles, including cars and aircraft, that have power immediately available after ignition.

For electric traction systems, higher voltages are desirable because higher voltages typically provide greater efficiency in the electrical motor systems. There is also overall lower system mass since the current carrying conductors can be of smaller gauge. Electric and hybrid electric developers prefer to operate around 300V to 400V, developers of commercial vehicles like trucks, busses, and hybrid airplanes prefer to operate at 600V to 800V. A single fuel cell delivers typically a voltage between 0.5 and 1V, in contrast to lithium ion cells, which operate between 2.3V and 4V. Therefore, it takes approximately 300 to 800 fuel cells in series to power a consumer vehicle, and approximately 600 to 1,800 in series to power a commercial vehicle. In contrast, approximately 75 to 173 lithium-ion cells are needed to power the same consumer vehicle, or 150 to 347 lithium-ion cells to power the same commercial vehicle.

The relatively large number of fuel cells that must be assembled into a stack also impacts the overall system performance and cost. More overhead is required to manage the very large number of fuel cells in the stack. This is also complicated by the need for isolation management as the voltage potential increases in order to maintain safety, complicated further by the continuous presence of water as the exhaust component of the system that must be safely removed during operation. As such, the majority of fuel cell systems produced are relatively low voltage, too low for typical industry standard traction systems. For these reasons, fuel cell systems in the 60 to 120V range are more cost-effective than high-voltage systems.

One approach for adapting low-voltage fuel cell systems to high-voltage traction applications is to utilize a DC-DC converter in order to allow a low-voltage fuel cell stack to drive a high-voltage load. DC-DC converters add losses, additional mass, and cost to the system. The DC-DC converter does not add any benefit to the system other than the conversion of voltage. It adds parasitic weight, space, and cost, and is especially impactful in aviation applications that are extremely weight sensitive. In some cases, the converter is integrated to some extent with the motor and motor control system. Such solutions require that the complete system be designed and optimized to work in this manner.

Currently available converters have a mass power ratio of around 1 kg for every 4 kW of power conversion. This does not take into account redundancy. In high-reliability applications where single points of failure within a system are not permitted, the DC-DC converter has to have a backup in case of failure. Therefore, a 200 kW converter with redundancy would have a mass of around 100 kg, which is significant, especially for weight sensitive traction applications. Such a solution would also require a substantial amount of volume and a cooling system for the converter, adding more mass to the system.

The DC-DC converters do not contribute anything to alleviating the single point of failure in the system since they are not themselves energy sources, only energy converters with parasitic loads as their price to operate. So two fuel cell systems, or an alternative energy source, must be supplied in order to provide redundant power in case of failure of a fuel cell system. As the fuel cell stack is often the most expensive component in the system, acquiring two would be a very substantial cost impact to the application. There is also an increase in overall volume to accommodate the additional hardware.

It is the intent of the present invention to provide a solution that blends high power and instant power of battery systems with the energy and fast refuel times of a cost-effective, low-voltage fuel cell stack through a novel topology. The battery system operates at high voltage matched to the load demands, and the fuel cell stack operates at low voltage, which improves safety and reduces mass and cost.

BRIEF DESCRIPTION OF THE DRAWINGS

The accompanying drawings, which are hereby incorporated into and constitute a part of this specification, illustrate embodiments of the present disclosure and, together with the description, serve to explain the principles of the invention. In the drawings, wherein like reference numerals represent like parts.

DETAILED DESCRIPTION

The present description provides novel systems and methods of using cost-effective, low-voltage fuel cell systems in weight sensitive, high reliability, high efficiency, high voltage traction applications by utilizing a switch mode battery system. The approach increases reliability, adds redundancy, and minimizes parasitic components such as DC-DC converters that add weight, reduce reliability, and increase system losses.

Figure 1:
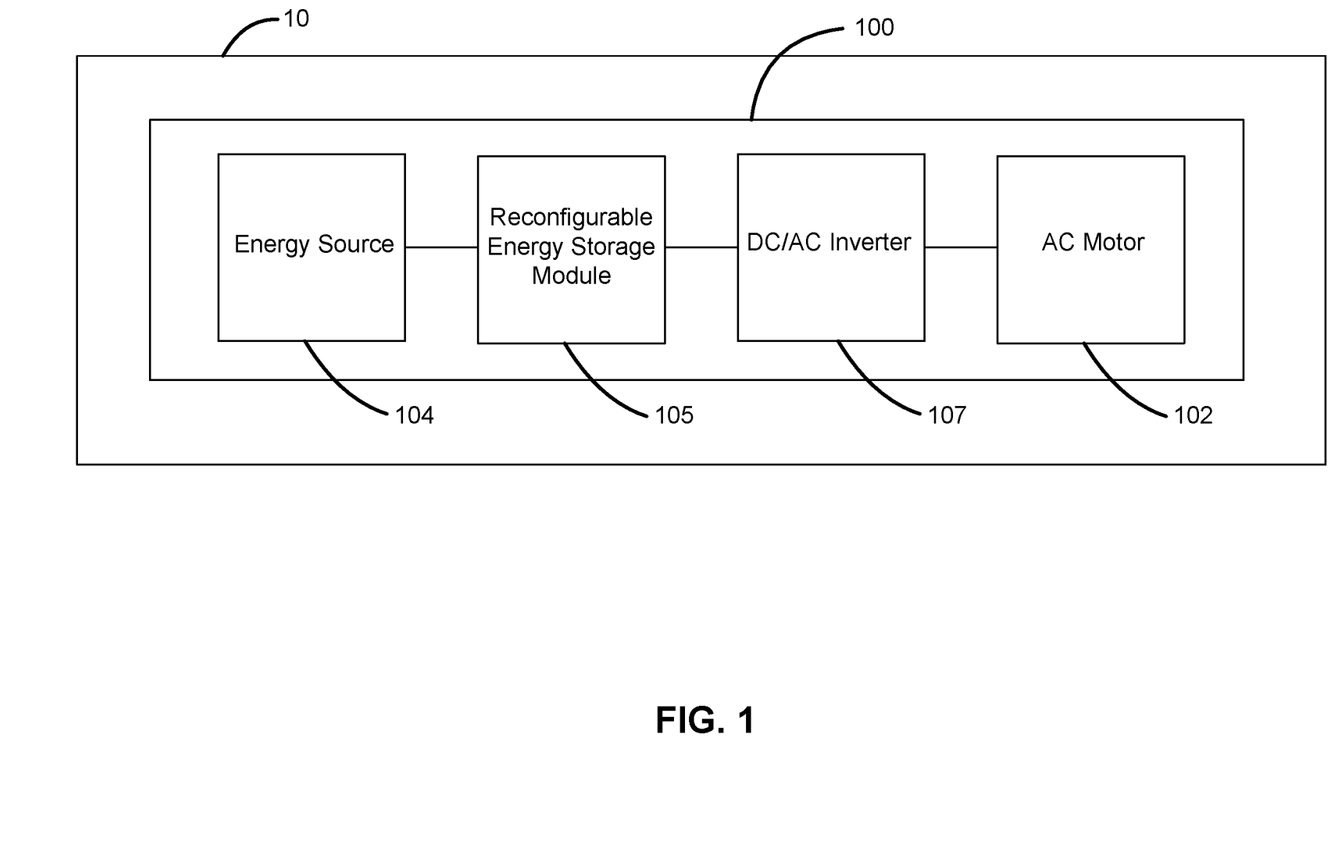
FIG. 1 illustrates an electric vehicle in accordance with embodiments of the present disclosure.

With initial reference to FIG. 1, an aircraft 10 comprises an energy storage and power delivery system 100. In various embodiments, aircraft 10 comprises an unmanned aerial vehicle caused to be moved by one or more traction motors. In other embodiments, aircraft 10 can be a passenger or cargo aircraft or a helicopter powered by one or more traction motors. Moreover, aircraft 10 may comprise any suitable vehicle that is caused to move, in whole or in part, by an asynchronous motor or A/C motor. Although described herein in connection with aircraft, this disclosure may be applicable to other vehicles with high reliability requirements as well as size, weight and power/energy density requirements.

In various embodiments, the redundancy of system 100 is particularly useful for aircraft applications. For example, in the event of failure of an energy storage and power delivery system in a land-based vehicle (such as an electric car), the electric motor or motors powering the vehicle will stop operating, and the vehicle will slowly decelerate and eventually stop. However, in electrically-powered aircraft, failure of the energy storage and power delivery system can be catastrophic, as the discontinued operation of the electric motor or motors providing power to the aircraft can cause rapid deceleration, and potentially, unplanned landing and possible crashing of the aircraft. Therefore, redundancy is particularly important to electrically-powered aircraft.

The energy storage and power delivery system 100 may comprise an energy source (e.g., fuel cell stack 104), a reconfigurable energy storage module 105, a DC/AC inverter 107, and the AC motor 102. The energy source and reconfigurable energy storage module provide sufficient electrical energy and power to a traction motor 102. In various embodiments, fuel cell stack 104 can comprise a relatively low voltage fuel cell stack, operating in the range of approximately 60V to approximately 120V. However, in other example embodiments, fuel cell stack 104 may operate at any suitable voltage level. Moreover, the energy source may comprise any suitable source of power that is suitable to charge the reconfigurable energy storage module 105 (described in greater detail herein). For example, the energy source may comprise a solid oxide fuel cell, compressed natural fuel cell, or a gas generator. For example, in an example embodiment the energy source can comprise a generator to charge the reconfigurable energy storage module 105. A generator in accordance with the present invention is any device capable of providing electrical energy to the reconfigurable energy storage module 105.

Traction motor 102 can comprise, for example, an electric motor configured to provide mechanical power to move a vehicle, such as aircraft 10 of FIG. 1. In various embodiments, traction motor 102 operates at a relatively high voltage, such as a voltage of approximately 300V to approximately 800V. For example, operating at a relatively high voltage range may improve the operating efficiency of traction motor 102, which in turn may reduce the overall mass and cost of system 100. However, in other example embodiments, traction motor 102 may operate at any suitable voltage range.

The DC/AC inverter 107, also known as a power inverter, may comprise any suitable electronic device or circuitry that changes direct current (DC) to alternating current (AC) for powering traction motor 102. For simplicity herein, the DC/AC inverter 107 is discussed herein as forming part of traction motor 102, though it can be a separate component, and in any event is located electrically connected between reconfigurable energy storage module 105 and traction motor 102.

Figure 2:
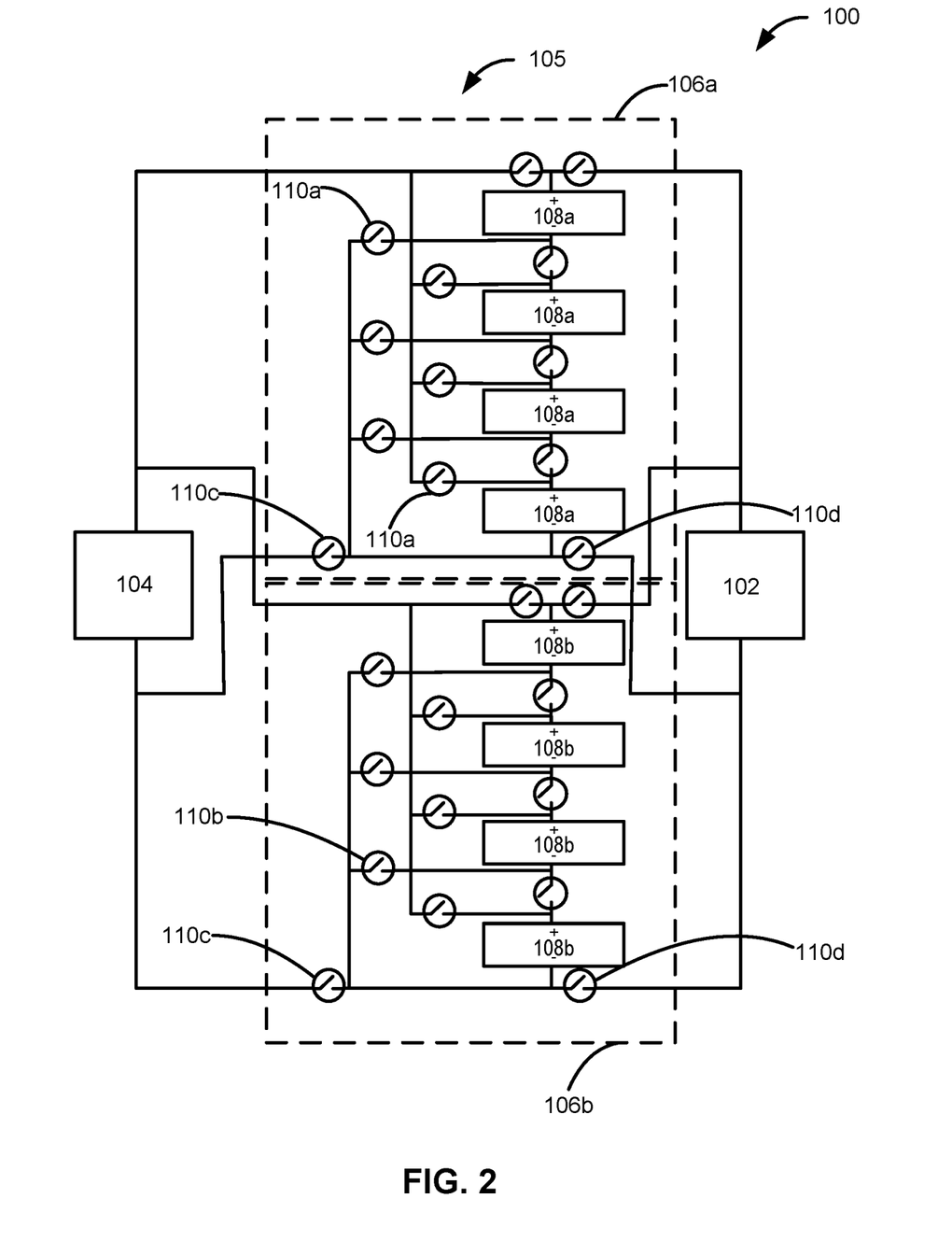
FIG. 2 illustrates an energy storage system in accordance with embodiments of the present disclosure.

With reference now to FIG. 2, reconfigurable energy storage module 105 can further comprise, for example, a first battery circuit 106a and a second battery circuit 106b. In various embodiments, battery circuits 106a and 106b are positioned between and in electrical communication with fuel cell stack 104 and traction motor 102. In various embodiments, first battery circuit 106a comprises a plurality of batteries 108a and battery switches 110a. Batteries 108a can be coupled to each other through battery switches 110a such that batteries 108a can be configured in series, parallel, or a combination of both. Switches 110a allow system 100 to switch between the various configurations, including combinations of one or more battery circuits (e.g., 106a and/or 106b), fuel cell stack 104, and traction motor 102 being coupled together.

For example, batteries 108a of first battery circuit 106a can be electrically coupled to one another in series by engaging battery switches 110a such that a positive electrode of each battery 108a is coupled to a negative electrode of another battery 108a. Further, batteries 108a can be electrically coupled to one another in parallel by engaging battery switches 110a such that each positive electrode of each battery 108a is coupled to the positive electrodes of one or more of the other batteries 108a.

In various embodiments, batteries 108a comprise a relatively comparable voltage range to that of fuel cell stack 104. For example, each of batteries 108a can operate at or near the same voltage as fuel cell stack 104. Thus, in an example embodiment, when configured in parallel, the battery circuit 106a is suitable to be charged by fuel cell stack 104.

Second battery circuit 106b can (similar to first battery circuit 106a) comprise a plurality of batteries 108b coupled to each other via battery switches 110b. In various embodiments, first battery circuit 106a and second battery circuit 106b comprise the same number of respective batteries 108a and 108b. In various embodiments, first battery circuit 106a and second battery circuit 106b comprise a different number of respective batteries 108a and 108b. Although described with specific reference to the drawing figures, any number of batteries 108a and/108b, including more or fewer than are illustrated in the various drawing figures, are within the scope of the present disclosure.

First battery circuit 106a and second battery circuit 106b can be electrically coupled to one or both of fuel cell stack 104 and traction motor 102. For example, system 100 can comprise one or more fuel cell switches 110c, connected between fuel cell stack 104 and first battery circuit 106a, and fuel cell stack 104 and second battery circuit 106b. In various embodiments, fuel cell stack switches 110c can be configured to electrically couple one or both of first battery circuit 106a and second battery circuit 106b to fuel cell stack 104.

System 100 can further comprise traction motor switches 110d. Similar to fuel cell stack switches 110c, traction motor switches 110d can be connected between traction motor 102 and first battery circuit 106a, and traction motor 102 and second battery circuit 106b. In various embodiments, traction motor switches 110d can be configured to electrically couple one or both of first battery circuit 106a and second battery circuit 106b to traction motor 102. First battery circuit 106a and/or second battery circuit 106b can, for example, be configured to supply a predetermined and/or desired voltage to traction motor 102. In various embodiments, a predetermined and/or desired voltage applied to traction motor 102 can comprise a voltage output capable of being provided by one or both of first battery circuit 106a and second battery circuit 106b. The predetermined and/or desired voltage may be selected, as described herein, by switching the batteries 108a and/or 108b from parallel arrangement to a series arrangement. By providing a predetermined or desired voltage from first battery circuit 106a and/or second battery circuit 106b to traction motor 102, system 100 eliminates the need for a voltage converter, such as a DC-DC voltage converter. As previously described, elimination of the DC-DC voltage converter is advantageous for at least the reasons that it decreases total cost and total weight of system 100, eliminates parasitic loss of power associated with DC-DC converters, and eliminates a potential failure point in system 100 (which eliminates the need for a redundant component).

Emphasizing this last point, the system is configured to exclude a DC/AC inverter. Stated another way, in an example embodiment, the system delivers power from a DC energy source at an output voltage level to an AC motor at an input voltage level, different from the output voltage level, without DC-DC voltage conversion. Thus, in an example embodiment, the system powers an AC motor using DC sources and voltage conversion based solely on switching the parallel/series configurations of the batteries (108a and/or 108b).

Figure 3:
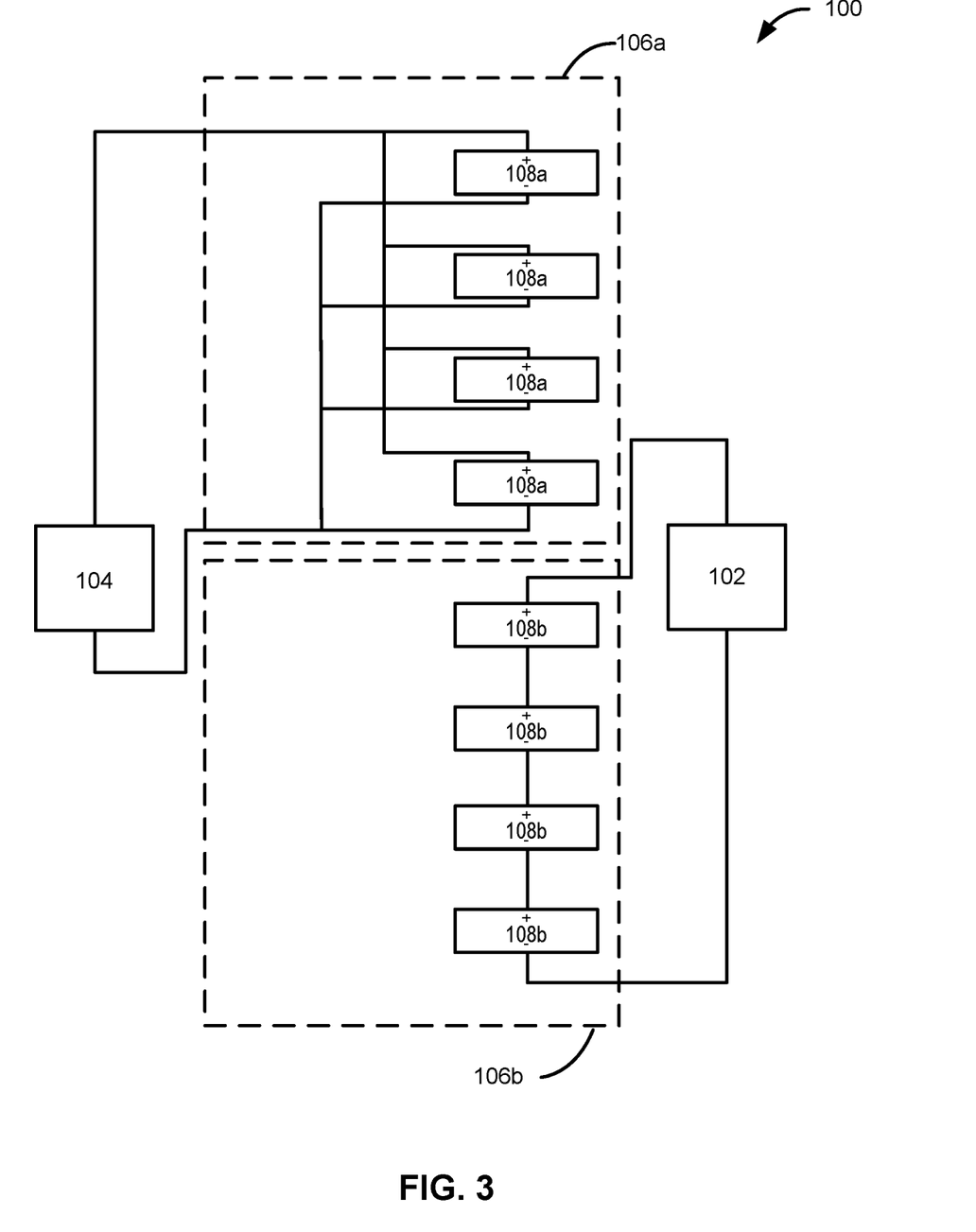
FIG. 3 illustrates a configuration of an energy storage system in accordance with embodiments of the present disclosure.
Figure 4:
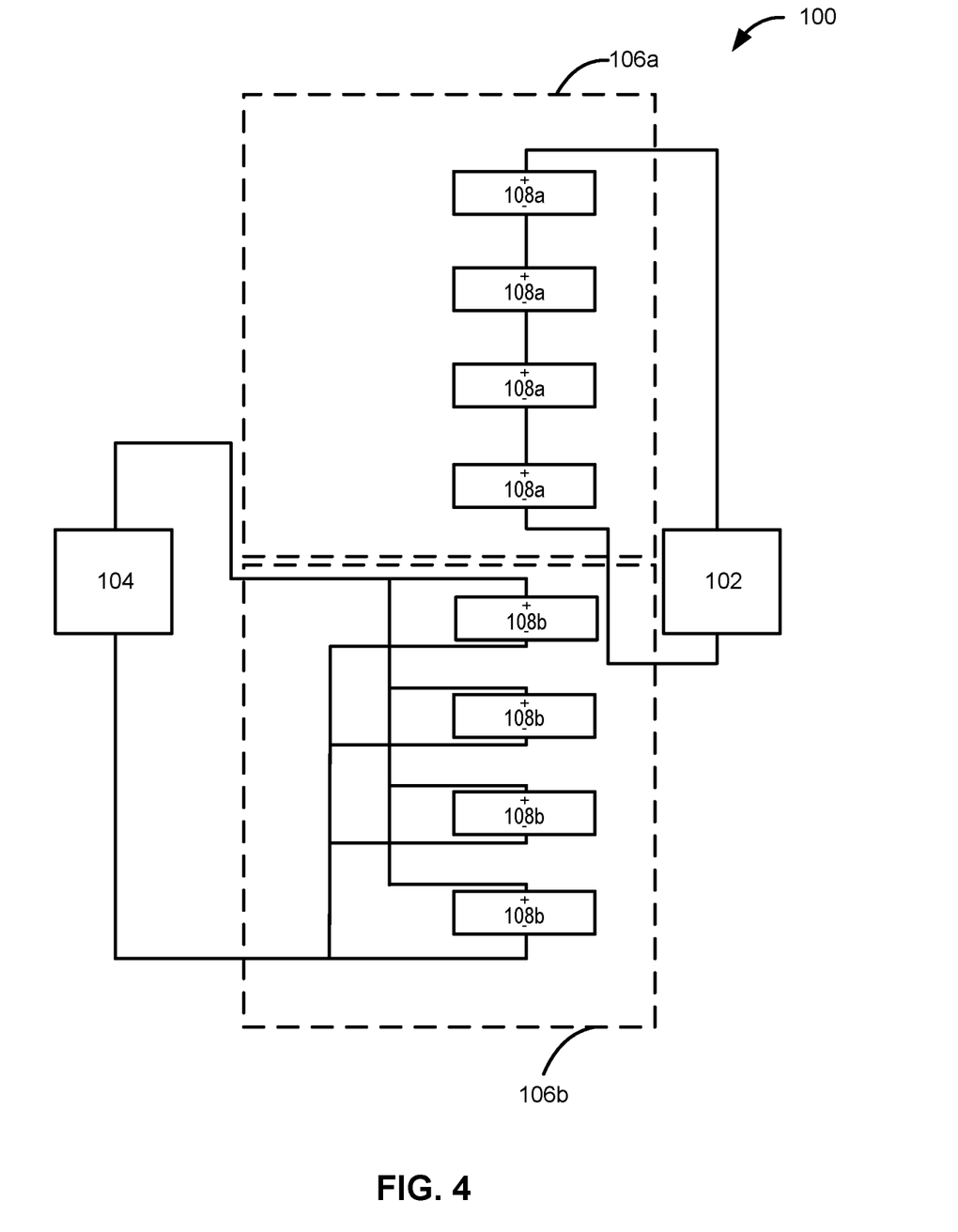
FIG. 4 illustrates another configuration of an energy storage system in accordance with embodiments of the present disclosure.
Figure 5:
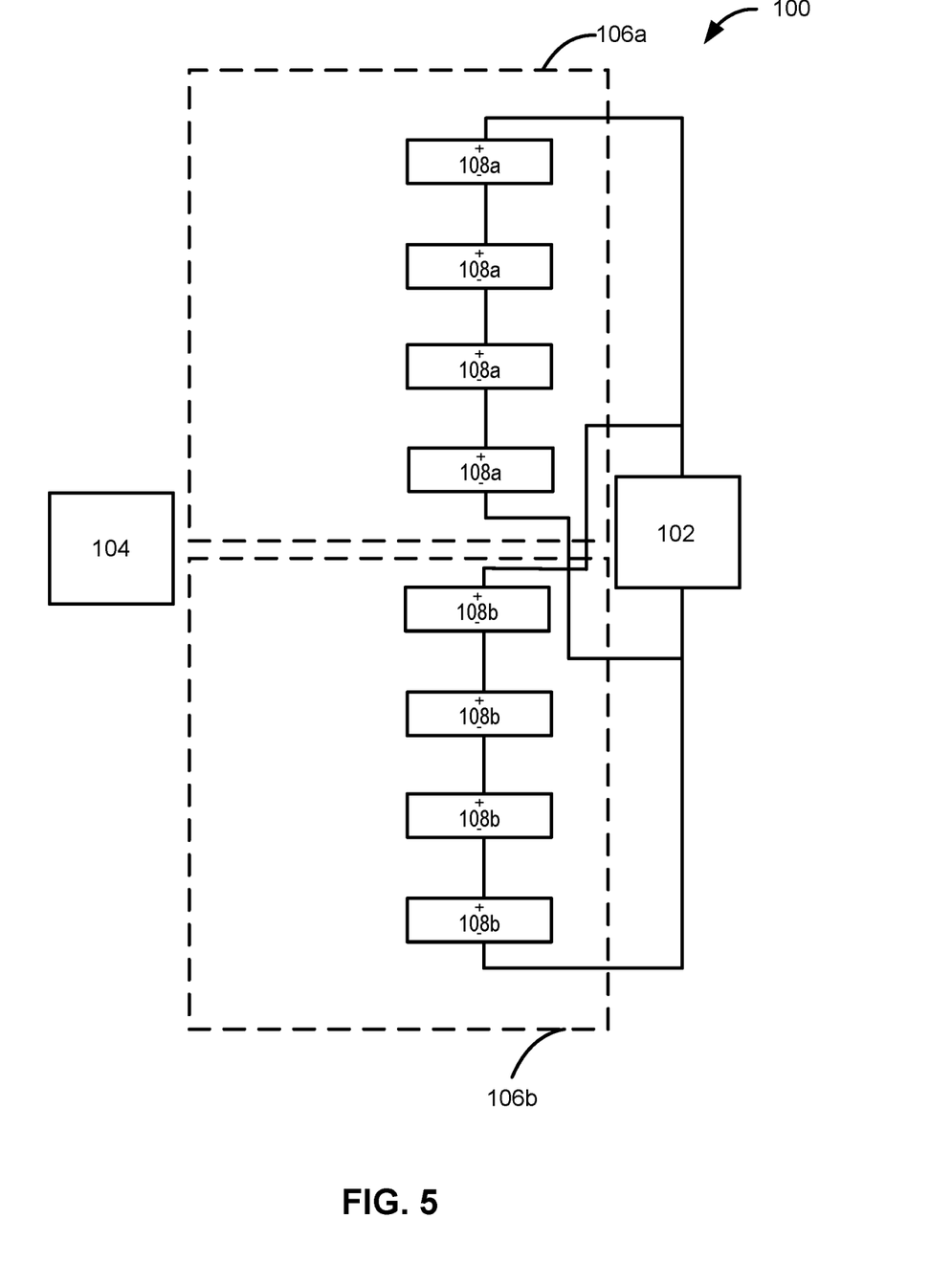
FIG. 5 illustrates yet another configuration of an energy storage system in accordance with embodiments of the present disclosure.

With initial reference to FIG. 3, system 100 can be configured to charge batteries 108a of first battery circuit 106a (referred to as "Mode A"). For the sake of simplicity, FIGS. 3, 4, and 5 illustrate various configurations of system 100 without illustrating each and every switch 110a, 110b, 110c, and 110d. The configurations of system 100 illustrated in FIGS. 3, 4, and 5 are not permanent, and instead represent one configuration of the various components, including switches 110a, 110b, 110c, and 110d. For example, first battery circuit 106a is configured (via switches 110a) such that batteries 108a are parallel with each other, and first battery circuit 106a is electrically coupled to fuel cell stack 104. In various embodiments, configuring first battery circuit 106a in parallel and coupling it to fuel cell stack 104 charges batteries 108a. For example, each of batteries 108a can be charged at a similar or identical voltage as fuel cell stack 104, providing for efficient operation of fuel cell stack 104 and charging of batteries 108a.

Further, second battery circuit 106b can be configured (via switches 110b) such that batteries 108b are in series with each other, and second battery circuit 106b is electrically coupled to traction motor 102. For example, configuring second battery circuit 106b in series and coupling it to traction motor 102 can discharge electrical energy from second battery circuit 106b to power traction motor 102. In various embodiments, batteries 108b are sized, selected, and/or configured such that when in configured in series, second battery circuit 106b provides a desired and/or predetermined voltage to traction motor 102.

Stated another way, coupling a parallel-configured battery circuit (such as 106a and/or 106b) to fuel cell stack 104 charges the battery circuit, and coupling a series-charged battery circuit to traction motor 102 provides power to traction motor 102.

With initial reference to FIG. 4, system 100 can be configured to charge second battery circuit 106b (referred to as "Mode B"). For example, second battery circuit 106b is configured (via switches 110b) such that batteries 108b are electrically connected in parallel with each other, and second battery circuit 106b is electrically coupled to fuel cell stack 104. Further, first battery circuit 106a can be configured (via switches 110a) such that batteries 108a are electrically connected in series with each other, and first battery circuit 106a is electrically coupled to traction motor 102. In such configurations of system 100, batteries 108b of second battery circuit 106b are charged by fuel cell stack 104, while traction motor 102 is powered by discharge from the series-configured batteries 108a of first battery circuit 106a.

In various embodiments, system 100 can transition back and forth between Mode A and B in order to provide continuous power to traction motor 102. For example, at least one battery circuit (for example, first battery circuit 106a and/or second battery circuit 106b) is connected to traction motor 102 at all times, to provide it with continuous power. Further, at no time is fuel cell stack 104 directly electrically coupled to traction motor 102. Thus, power is continuously delivered by system 100 to traction motor 102 by some combination of fuel cell stack 104, first battery circuit 106a, and second battery circuit 106b.

With initial reference to FIG. 5, a "Fuel Stack Failure Mode" of system 100 is illustrated. In various embodiments, in the event that fuel cell stack 104 experiences a failure or malfunction during operation, fuel cell stack 104 is electrically isolated by decoupling or disconnecting first battery circuit 106a and second battery circuit 106b from fuel cell stack 104. Such decoupling can, for example, improve the safety of the operation of system 100. Further, at least one of first battery circuit 106a and second battery circuit 106b can be electrically coupled to traction motor 102 (referred to as "Mode AB"). Mode AB provides multiple levels of redundancy in that there are two separate and/or independent battery circuits (first battery circuit 106a and second battery circuit 106b) that can supply power to traction motor 102 in case of loss of power at fuel cell stack 104. If one of the battery circuits fails, the other battery circuit continues to provide power to traction motor 102. The size of the battery circuits will depend upon the application (for example, the voltage requirement of traction motor 102), and typically, the battery circuits are sized to provide sufficient power and energy to enable safe disposition of the vehicle as required.

In various embodiments, system 100 can be configured in a "Battery Circuit Failure Mode." With reference back to FIG. 2, if first battery circuit 106a experiences a failure or fault, it can be electronically isolated from fuel cell stack 104, traction motor 102, and second battery circuit 106b. Fuel cell stack switch 110c and traction motor switch 110d can be configured to decouple first battery circuit 106a from other components of system 100. Further, second battery circuit 106b can, via fuel cell stack switch 110c, traction motor switch 110d, and second battery circuit switches 110b, be configured in a series configuration, and electronically coupled to traction motor 102 to provide power to the motor. Further, the same Battery Circuit Failure Mode can, in the event of a failure or fault in second battery circuit, be used to isolate second battery circuit 106b from the other components of system 100.

System 100 can further operate in, for example, a "Take Off" mode. Take Off mode may, for example, provide traction motor 102 with an increased level of power, to meet the need for increased thrust and/or lift during take-off of an aircraft. In various embodiments, system 100 is utilized to provide power to an electric vertical take-off and landing ("eVTOL") aircraft. However, system 100 can be utilized by any suitable aircraft. During Take Off mode, both first battery circuit 106a and second battery circuit 106b are electrically coupled, in parallel to one another, to traction motor 102. The Take Off mode configuration may also be used for other situations in which increased power is needed, such as landing of an aircraft (for example, an eVTOL aircraft). Moreover, even with only one battery circuit coupled to traction motor 102, the series configuration of the battery circuit may provide the power necessary to achieve acceleration, take-off, launch, or landing.

In various embodiments, switches 110a and/or 110b can be low speed switching mechanical or solid state switches. For example, system 100 may switch between multiple configurations (such as Mode A, Mode B, Mode AB, Fuel Cell Failure Mode, Battery Circuit Failure Mode, Take Off Mode, or others) relatively infrequently, such as on the order of tens of seconds, and therefore mechanical switches (such as contactors and relay) can be used. This low frequency switching between configurations can, for example, can induce a relatively low amount of stress on switches 110a and/or 110b that comprise mechanical devices, and further, may minimize the timing criticality in the switching system. Such low frequency switching switches 110a and/or 110b can allow both first battery circuit 106a and second battery circuit 106b to be coupled to traction motor 102 for one, two, or more seconds to ensure continuous power deliver. In various embodiments, switches 110a and/or 110b comprises solid state switches which spend most of the time in the ON or OFF states, and not in a transitional state in which heat and stress could cause failure of the solid state switches 110a and/or 110b. By predominantly maintaining an ON or OFF state, solid state switches 110a and/or 110b operate at their most efficient states and therefore do not need much cooling and offer very low loss to system 100. This may provide a benefit over high speed switching devices used in most converter systems (such as traditional DC-DC converters).

Further, switches 110a-110d may comprise, for example, a single pole, single throw switch. In such embodiments, the switch couples or decouples a single component or circuit to another component or circuit within system 100. In other embodiments, one or more of switches 110a-110d can comprise a single pole, double throw switch, capable of selecting a specific electrical coupling between two possible choices. For example, a single fuel cell stack switch 110c of the single pole, double throw type can be used to electrically couple one of first battery circuit 106a or second battery circuit 106b to fuel cell stack 104. Any configuration of switches, including switches having multiple pulls and multiple throws, are with the scope of the present disclosure.

In various embodiments, a combination of mechanical and solid state switches 110a, 110b, 110c, and/or 110d may be used. Because solid state switches do not offer true isolation and can fail in a closed state, mechanical switches may be used in junctions where a closed state failure is undesirable. For example, mechanical switches 110c and/or 110d can be used to electrically couple and decouple first battery circuit 106a and/or second battery circuit 106b to and from fuel cell stack 104 and traction motor 102, with solid state switches 110a and/or 110b used in the intervening junctions.

Further, low speed switching switches 110 can, for example, improve the efficiency of one or more of the battery circuits of system 100. Most batteries (such as batteries 108a and/or batteries 108b) do not readily absorb energy immediately after transitioning from a resting state. It can take seconds after current is initially applied before batteries efficiently begin charging. Therefore, it may be beneficial for system 100 to utilize relatively slow switching times between battery circuits, such as, for example, tens of seconds. This is very different from a switch mode capacitor system that would require high speed switching in order to keep the capacitor size reasonable. Batteries can store large amounts of energy with up to 99% efficiency (in the case of lithium-ion batteries), even at relatively high charging rates.

In various embodiments, system 100 provides increased efficiency over conventional or typical energy delivery systems. Because switches 110 can operate in their most effective states most of the time, batteries 108a and/or 108b are operating in a continuous direction, charge or discharge, for long periods of time, and fuel cell stack 104 may be shielded from large load variations that might cause it to operate at a lower efficiency state by first battery circuit 106a and/or second battery circuit 106b.

Embodiments of the present disclosure may also provide high redundancy by, for example, providing two or more separate battery circuits (e.g., 106a and 106b) to provide power to traction motor 102, and a dissimilar technology fuel cell stack 104 as the charging source. By utilizing dissimilar technologies, system 100 may be less likely to suffer a single failure that will disable the entire system 100. If fuel cell stack 104 fails, battery circuits 106a and 106b may continue to provide power to traction motor 102, and can disconnect themselves from fuel cell stack 104 entirely (as in Failure Mode, described above). If one battery circuit fails, it can be isolated from the remainder of system 100, including traction motor 102, fuel cell stack 104, and the remaining battery circuit (which can continue to provide power to traction motor 102). Additional levels of redundancy can be added by a third battery circuit, in order to allow continual operation of fuel cell stack 104 with two battery circuits in the event that one battery circuit fails or is otherwise disabled. The present disclosure further contemplates fourth battery circuits, fifth battery circuits, and so on. In the case of three battery circuits the system would still have 66% operating capacity, and in the case of four battery circuits, the system would still have 75% operating capacity on failure of one battery circuit.

In aircraft applications, for example, redundancy in system 100 is particularly important. If traction motor 102 loses power during the flight of an aircraft, it can cause the aircraft to rapidly descend and/or crash. In land-based vehicle applications, failure of system 100 to provide power to traction motor 102 may cause, for example, deceleration of the vehicle. The redundancy provided herein provides additional time for the vehicle to safely land or park.

Various embodiments of the present disclosure may be more cost effective than conventional or typical systems in that they can utilize a single low voltage, efficient, fuel cell stack 104. Although system 100 comprises more than one battery circuit, the use of multiple battery circuits provides redundancy in the system and increases the overall efficiency (as opposed to using DC-DC converters).

Figure 6:
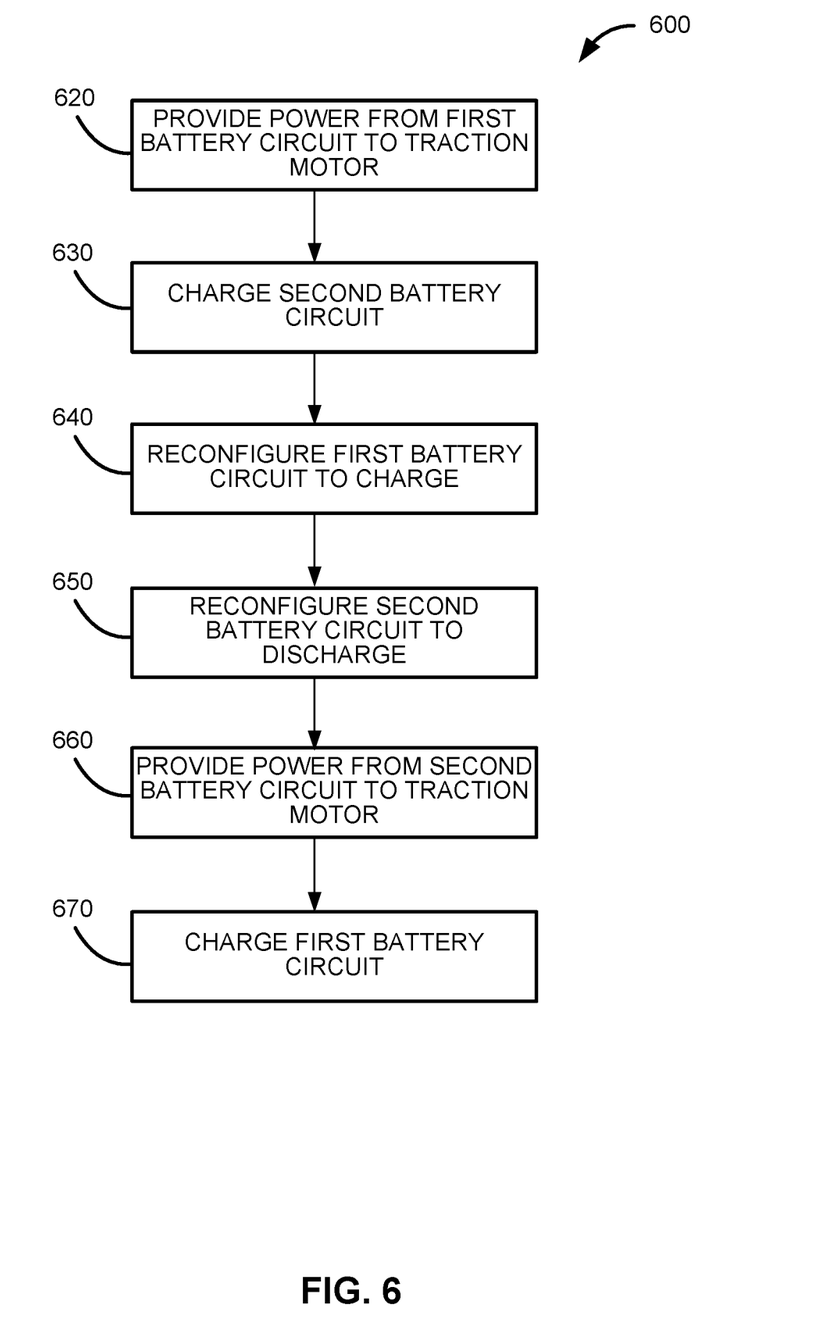
FIG. 6 illustrates a method of operating an energy storage system in accordance with embodiments of the present disclosure.

With initial reference to FIG. 6, a method 600 of operating system 100 within a vehicle, such as an aircraft, in accordance with the present invention is illustrated. In various embodiments, method 600 comprises a step 620 of providing power from the first battery circuit to the traction motor. As the aircraft is flying, electrical power is provided to traction motor 102 via first battery circuit 106a. First battery circuit 106a is in the series configuration, such that batteries 108a are electrically coupled together in the series configuration by first battery switches 110a.

Method 600 can further comprise, for example, step 630 of charging the second battery circuit. As first battery circuit 106a is discharging and providing power to traction motor 102, second battery circuit 106b is electrically coupled to fuel cell stack 104, and charging. During charging, batteries 108b of second battery circuit 106b are electrically coupled in the parallel configuration. Steps 620 and 630 of method 600 can, for example, occur simultaneously, such that second battery circuit 108b is charging as first battery circuit 106a provides power to traction motor 102.

In various embodiments, method 600 further comprises a step 630 of reconfiguring the first battery circuit to charge. After sufficient discharge from first battery circuit 106a, system 100 can be reconfigured to allow first battery circuit 106a to recharge. To transition from discharge to charging, first battery switches 110a switch first batteries 108a of first battery circuit 106a from series configuration to parallel configuration. As first batteries 108a are reconfigured to the parallel configuration, at least one fuel cell stack switch 110c switches such that first battery circuit 106a is electrically coupled to fuel cell stack 104. In various embodiments, fuel cell stack switch 110c can comprise a single switch (such as a single pole, double throw switch), or more than one fuel cell stack switch 110c (such as, for example, single pole, single throw switches) can be utilized.

Step 630 can also comprise switching, via one or more traction motor switches 110d, first battery circuit 106a from being electrically coupled to traction motor to being electrically decoupled or disconnected from traction motor 102.

Method 600 can further comprise, for example, a step 640 of reconfiguring the second battery circuit to discharge. Second battery switches 110b switch second batteries 108b of second battery circuit 106b from parallel configuration to series configuration. As second batteries are reconfigured to the series configuration, second battery circuit 106b is electrically decoupled or disconnected from fuel cell stack 104. Further, second battery circuit 106b is switched, via one or more traction motor switches 110d, from being electrically decoupled or disconnected to traction motor to being electrically coupled to traction motor 102.

In various embodiments, after steps 640 and 650, method 600 comprises a step 660 of providing power from second battery circuit 106b to traction motor 102, and a step 670 of charging first battery circuit 106a. Similar to steps 620 and 630, steps 660 and 670 can occur simultaneously. After sufficient electrical energy is discharged from second batteries 108b of second battery circuit 106b, method 600 can be repeated, starting with steps 610 and 620. These steps may be used in connection with additional battery circuits, where one or more battery circuits are charged while one or more battery circuits are discharged. For example, a first circuit may be charged while a second circuit is discharged, and a third charged circuit is on float; and then the system can be switched to put the first circuit on float, the second circuit on charge, and the third circuit on discharge; and so on with the applicable switching of the parallel and series configurations of the batteries.

Further, both battery circuits can be configured to provide simultaneously power to traction motor 102. For example, first battery switches 110a can configure batteries 108a of first battery circuit 106a in series configuration and second battery switches 110b can configure batteries 108b of second battery circuit 106b in series configuration. At least one fuel cell stack switch 110c can decouple both first battery circuit 106a and second battery circuit 106b from fuel cell stack 104, and traction motor switch(es) 110d can electrically couple both first battery circuit 106a and second battery circuit 106b to traction motor 102.

Although described herein in many instances as changing the voltage from a low voltage charging configuration to a high voltage discharging configuration, in various embodiments, the charging and discharging are effected at the same voltage level, but the battery circuits system still operates as described herein, but without reconfiguring the parallel/series configuration of the energy cells within each battery circuit. The benefit of this design, as in the other designs, remains the redundancy and the separation of the source from the load. One generator, for example, is separated from the load by two battery packs switching back and forth between charging from the generator and discharging to the load. If the generator fails, the packs are all connected to the load.

Benefits of this system include the ability to use electric motors in aviation. In an example embodiment, the herein described system assists with peak shaving and boost modes. In particular, in an example embodiment, noise reduction can be achieved by using fuel cells to power the aircraft, as opposed to using gas powered generators or gas powered engines. In particular, even if gas powered generators are used, in an example embodiment, during a take-off phase, the take-off can occur on battery power without recharging the battery circuits. Then when a sufficient altitude is achieved, the gas powered generator can be engaged to charge at least one of the more than one battery circuits. This will make take-off much quieter and reduces localized pollution.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for providing electrical energy to a traction motor comprising:
   a first battery circuit having at least two first batteries electrically coupled together via a plurality of first battery switches, wherein the first battery switches can engage to configure the first battery circuit in a series configuration and a parallel configuration;
   a second battery circuit having at least two second batteries electrically coupled together via a plurality of second battery switches, wherein the second battery switches can engage to configure the second battery circuit in a series configuration and a parallel configuration;

a fuel cell stack switchingly coupled to the first battery circuit and the second battery circuit to couple the fuel cell stack to one of the first battery circuit and the second battery circuit, while isolating the other of the first battery circuit and the second battery circuit; and
a traction motor switchingly coupled to the first battery circuit and the second battery circuit to couple the traction motor to the first battery circuit, the second battery circuit, or both the first battery circuit and the second battery circuit simultaneously,
wherein the system is configured such that; in a first state, the at least two first batteries of the first battery circuit are connected in the parallel configuration, the fuel cell stack is connected to the first battery circuit and the fuel cell stack is isolated from the second battery circuit, wherein the at least two second batteries of the second battery circuit are connected in the series configuration, the traction motor is connected to the second battery circuit and the traction motor is isolated from the first battery circuit, and wherein the traction motor is powered from the at least two second batteries of the second battery circuit during charging of the at least two first batteries of the first battery circuit by the fuel stack; and, in a second state, the at least two second batteries of the second battery circuit are connected in the parallel configuration, the fuel cell stack is connected to the second battery circuit and the fuel cell stack is isolated from the first battery circuit, wherein the at least two first batteries of the first battery circuit are connected in the series configuration, the traction motor is connected to the first battery circuit and the traction motor is isolated from the second battery circuit, and wherein the traction motor is powered from the at least two first batteries of the first battery circuit during charging of the at least two second batteries of the second battery circuit by the fuel stack.

2. The system of claim 1, wherein the at least two first batteries of the first battery circuit are in the parallel configuration, wherein the fuel cell stack is coupled to the first battery circuit and isolated from the second battery circuit, wherein the at least two second batteries of the second battery circuit are in the series configuration, and wherein the traction motor is coupled to the second battery circuit and isolated from the first battery circuit.

3. The system of claim 1, wherein the at least two first batteries of the first battery circuit are in the series configuration, wherein the traction motor is coupled to the first battery circuit and isolated from the second battery circuit, wherein the at least two second batteries of the second battery circuit are in the parallel configuration, and wherein the fuel cell stack is coupled to the second battery circuit and isolated from the first battery circuit.

4. The system of claim 1, wherein the at least two first batteries of the first battery circuit are in the series configuration, wherein the at least two second batteries of the second battery circuit are in the series configuration, and the traction motor is coupled to the first battery circuit and the second battery circuit.

5. The system of claim 1, wherein the first battery circuit and the second battery circuit are each charged, at different times, at a first voltage and each discharged at a second voltage that is higher than the first voltage.

6. The system of claim 1, wherein the fuel cell stack is switchingly coupled to the first battery circuit and the second battery circuit via a single pole, double throw switch configured to switch between coupling the fuel cell stack to the first battery circuit and the second battery circuit.

7. A DC-DC converter-less system for providing electrical energy to a traction motor comprising:
a first battery circuit having at least two first batteries electrically coupled together via a plurality of first battery solid state switches, wherein the first battery solid state switches can engage to configure the first battery circuit in a series configuration and a parallel configuration;
a second battery circuit having at least two second batteries electrically coupled together via a plurality of second battery solid state switches, wherein the second battery solid state switches can engage to configure the second battery circuit in a series configuration and a parallel configuration;
a fuel cell stack coupled to at least one fuel cell stack mechanical switch(es), wherein the fuel cell stack mechanical switch(es) can engage to couple the fuel cell stack to the first battery circuit, the second battery circuit, or both the first battery circuit and the second battery circuit simultaneously; and
a traction motor coupled to at least one traction motor mechanical switch(es), wherein the traction motor mechanical switch(es) can engage to couple the traction motor to the first battery circuit, the second battery circuit, or both the first battery circuit and the second battery circuit simultaneously,
wherein the system is configured such that; in a first state, the at least two first batteries of the first battery circuit are connected in the parallel configuration, the fuel cell stack is connected to the first battery circuit and the fuel cell stack is isolated from the second battery circuit, wherein the at least two second batteries of the second battery circuit are connected in the series configuration the traction motor is connected to the second battery circuit and the traction motor is isolated from the first battery circuit, and wherein the traction motor is powered from the at least two second batteries of the second battery circuit during charging of the at least two first batteries of the first battery circuit by the fuel stack; and, in a second state, the at least two second batteries of the second battery circuit are connected in the parallel configuration, the fuel cell stack is connected to the second battery circuit and the fuel cell stack is isolated from the first battery circuit, wherein the at least two first batteries of the first battery circuit are connected in the series configuration, the traction motor is connected to the first battery circuit and the traction motor is isolated from the second battery circuit, and wherein the traction motor is powered from the at least two first batteries of the first battery circuit during charging of the at least two second batteries of the second battery circuit by the fuel stack.

8. The system of claim 7, wherein the at least two first batteries of the first battery circuit are in the parallel configuration, wherein the fuel cell mechanical switch(es) couple the fuel cell stack to the first battery circuit, wherein the at least two second batteries of the second battery circuit are in the series configuration, and wherein the traction motor mechanical switch(es) couple the traction motor to the second battery circuit.

9. The system of claim 7, wherein the at least two first batteries of the first battery circuit are in the series configuration, wherein the traction motor mechanical switch(es) couple the traction motor to the first battery circuit, wherein the at least two second batteries of the second battery circuit are in the parallel configuration, and wherein the fuel cell stack mechanical switch(es) couple the fuel cell stack to the second battery circuit.

10. The system of claim 7, wherein the at least two first batteries of the first battery circuit are in the series configuration, wherein the at least two second batteries of the second battery circuit are in the series configuration, and the traction motor mechanical switch(es) couple the traction motor to the first battery circuit and the second battery circuit.

11. The system of claim 7, wherein the first battery circuit and the second battery circuit are each charged, at different times, at a first voltage and each discharged at a second voltage that is higher than the first voltage.

12. A method of providing electrical energy to a traction motor comprising:

in a first state:
providing electrical power to the traction motor via a first battery circuit having at least two first batteries electrically coupled together via a plurality of first battery switches, wherein the first battery switches configure the first battery circuit in a series configuration;
charging, via a fuel cell stack, a second battery circuit having at least two second batteries electrically coupled together via a plurality of second battery switches, wherein the second battery switches configure the second battery circuit in a parallel configuration; wherein the fuel cell stack is isolated from the first battery circuit, wherein the traction motor is isolated from the second battery circuit, and wherein the traction motor is powered from the at least two first batteries of the first battery circuit during charging of the at least two second batteries of the second battery circuit by the fuel stack;

in a second state:
switching, via the first battery switches, the first battery circuit to a parallel configuration;
switching, via the second battery switches, the second battery circuit to a series configuration;
decoupling, via two traction motor switches, the first battery circuit from the traction motor, wherein the traction motor is isolated from the first battery circuit;
decoupling, via at least one fuel cell stack switch, the second battery circuit from the fuel cell stack, wherein the fuel cell stack is isolated from the second battery circuit;
coupling, via the two traction motor switches, the first battery circuit to the fuel cell stack; and
coupling, via the two traction motor switches, the second battery circuit to the traction motor, wherein the traction motor is powered from the at least two second batteries of the second battery circuit during charging of the at least two first batteries of the first battery circuit by the fuel stack.

13. The method of claim 12, wherein the traction motor provides mechanical energy to transport an aircraft.

14. The method of claim 12, further comprising switching, via the first battery switches, the first battery circuit to a series configuration, and coupling, via the two traction motor switches, both the first battery circuit and the second battery circuit to the traction motor.

15. The method of claim 12, wherein the at least one fuel cell stack switch comprises a single pole, double throw switch configured to switch between coupling the fuel cell stack to the first battery circuit and the second battery circuit.

* * * * *